US009521016B2

(12) United States Patent
Oh

(10) Patent No.: US 9,521,016 B2
(45) Date of Patent: Dec. 13, 2016

(54) DATA TRANSMISSION APPARATUS AND METHOD FOR TRANSMITTING DATA IN DELAY-INSENSITIVE DATA TRANSMISSION METHOD SUPPORTING HANDSHAKE PROTOCOL

(71) Applicant: Electronics and Telecommunications Research Institute, Daejeon (KR)

(72) Inventor: Myeong Hoon Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/748,844

(22) Filed: Jun. 24, 2015

(65) Prior Publication Data

US 2016/0087763 A1 Mar. 24, 2016

(30) Foreign Application Priority Data

Sep. 24, 2014 (KR) .......................... 10-2014-0127830

(51) Int. Cl.
*H04L 25/00* (2006.01)
*H04L 25/49* (2006.01)
(52) U.S. Cl.
CPC ........... *H04L 25/00* (2013.01); *H04L 25/4917* (2013.01)
(58) Field of Classification Search
CPC .. H04L 25/0264; H04L 25/49; H04L 25/4906; H04L 25/4904; H04L 25/493; H04L 1/1621; H04L 47/12; H04L 25/00; H04L 25/4917; H04J 3/0602; G06F 13/385
USPC ................................................. 375/295, 316
See application file for complete search history.

(56) References Cited

U.S. PATENT DOCUMENTS

| 6,195,397 | B1 | 2/2001 | Kwon |
| 7,282,946 | B2 | 10/2007 | Har et al. |
| 7,885,254 | B2 | 2/2011 | Oh et al. |
| 8,705,592 | B2 | 4/2014 | Oh et al. |

(Continued)

FOREIGN PATENT DOCUMENTS

| KR | 10-0447217 B1 | 8/2004 |
| KR | 10-2010-0060616 A | 6/2010 |

OTHER PUBLICATIONS

Oh, Myeong Hoon et al., "A New Data Encoding Scheme using Multi-Valued Logic for an Asynchronous Handshake Protocol, "Consumer Electronics (ISCE 2014), The 18th IEEE International Symposium on Jun. 24, 2014, pp. 1-2.

*Primary Examiner* — Freshteh N Aghdam
(74) *Attorney, Agent, or Firm* — Nelson Mullins Riley & Scarborough LLP; Anthony A. Laurentano

(57) ABSTRACT

Provided are a data transmission apparatus and method for transmitting data in a Delay-Insensitive (DI) data transmission method supporting a handshake protocol. The data transmission apparatus includes a sender which outputs a binary-valued logic signal based on binary-valued logic, and an encoder which encodes the binary-valued logic signal input through input wires into a multi-valued logic signal based on multi-valued logic and transmits the encoded multi-valued logic signal to a decoder through output wires. Here, the encoder includes a mapping table which stores input variables including the number of input wires and the number of output wires smaller than the number of input wires and the multi-valued logic signal corresponding to the input variables, and encodes the binary-valued logic signal into the multi-valued logic signal with reference to the mapping table.

10 Claims, 9 Drawing Sheets

(56) References Cited

U.S. PATENT DOCUMENTS

| | | | | |
|---|---|---|---|---|
| 2008/0123765 A1* | 5/2008 | Oh | ............... | H04L 25/0264 |
| | | | | 375/267 |
| 2010/0135430 A1* | 6/2010 | Oh | ............... | H04L 25/4923 |
| | | | | 375/295 |
| 2013/0070768 A1* | 3/2013 | Venkatraman | ............ | G06F 1/12 |
| | | | | 370/392 |
| 2014/0064096 A1* | 3/2014 | Stevens | ............... | G06F 13/385 |
| | | | | 370/236 |
| 2014/0372784 A1* | 12/2014 | Manohar | ............... | G06F 9/3871 |
| | | | | 713/375 |

* cited by examiner

FIG. 3

| $2^N+1$ INPUTS | | | | | $\chi^M$ OUTPUTS | | | | | | | | | |
|---|---|---|---|---|---|---|---|---|---|---|---|---|---|---|
| | | | | | 1 | 2 | | 3 | | | ... | M | | |
| req | $D_1$ | ... | $D_{N-1}$ | $D_N$ | $W_1$ | $W_1$ | $W_2$ | $W_1$ | $W_2$ | $W_3$ | | $W_1$ | ... | $W_M$ |
| 0 | X | X | X | X | $v_1$ | $v_1$ | $v_1$ | $v_1$ | $v_1$ | $v_1$ | | $v_1$ | | $v_1$ |
| 1 | 0 | 0 | 0 | 0 | $v_2$ | $v_1$ | $v_2$ | $v_1$ | $v_1$ | $v_2$ | | $v_1$ | | $v_2$ |
| 1 | 0 | 0 | 0 | 1 | $v_3$ | $v_1$ | $v_3$ | $v_1$ | $v_1$ | $v_3$ | | $v_1$ | | $v_3$ |
| 1 | 0 | 0 | 1 | 0 | $v_4$ | $v_1$ | $v_4$ | $v_1$ | $v_1$ | $v_4$ | | $v_1$ | | $v_4$ |
| 1 | 0 | 0 | 1 | 1 | $v_5$ | $v_1$ | $v_5$ | $v_1$ | $v_1$ | $v_5$ | | $v_1$ | | $v_5$ |
| ... | ... | ... | ... | ... | | | | | | | | | | |
| 1 | 0 | ... | 1 | 1 | | $v_1$ | $v_{\lceil 2\lceil 2^N+1 \rceil \rceil}$ | $v_1$ | $v_1$ | $v_{\lceil 3\lceil 2^N+1 \rceil \rceil}$ | | $v_1$ | ... | $v_{\lceil M\lceil 2^N+1 \rceil \rceil}$ |
| ... | ... | ... | ... | ... | | | | | | | | | | |
| 1 | 1 | ... | 1 | 1 | $v_{\lceil 2^N+1 \rceil}$ | $v_{\lceil 2\lceil 2^N+1 \rceil \rceil}$ | $v_{\lceil 2\lceil 2^N+1 \rceil \rceil}$ | $v_{\lceil 3\lceil 2^N+1 \rceil \rceil}$ | $v_{\lceil 3\lceil 2^N+1 \rceil \rceil}$ | $v_{\lceil 3\lceil 2^N+1 \rceil \rceil}$ | | $v_{\lceil M\lceil 2^N+1 \rceil \rceil}$ | | $v_{\lceil M\lceil 2^N+1 \rceil \rceil}$ |

FIG. 6

| r(req) | a | b | c | $W_1$ | $W_2$ |
|--------|---|---|---|-------|-------|
| 1 | 1 | 1 | 1 | 2I | 2I |
| 1 | 1 | 1 | 0 | 2I | I |
| 1 | 1 | 0 | 1 | 2I | 0 |
| 1 | 1 | 0 | 0 | I | 2I |
| 0 | x | x | x | I | I |
| 1 | 0 | 1 | 1 | I | 0 |
| 1 | 0 | 1 | 0 | 0 | 2I |
| 1 | 0 | 0 | 1 | 0 | I |
| 1 | 0 | 0 | 0 | 0 | 0 |

FIG. 7

| | |
|---|---|
| $W_1$ | $2I\_en_1 = rabc+ra\bar{b}\bar{c}+ra\bar{b}c = ra(bc+b\bar{c}+\bar{b}c) = ra(b+\bar{b}c)$ <br> $I\_en_1 = \bar{r}+ra\bar{b}\bar{c}+r\bar{a}bc = \bar{r}+r(a\bar{b}\bar{c}+\bar{a}bc)$ <br> $0(extra) = r\bar{a}\bar{b}\bar{c}+r\bar{a}b\bar{c}+r\bar{a}\bar{b}c = r\bar{a}(\bar{b}\bar{c}+b\bar{c}+\bar{b}c) = r\bar{a}(\bar{b}+\bar{b}c)$ |
| $W_2$ | $2I\_en_1 = rabc+ra\bar{b}\bar{c}+r\bar{a}\bar{b}\bar{c} = r(abc+a\bar{b}\bar{c}+\bar{a}\bar{b}\bar{c})$ <br> $I\_en_1 = \bar{r}+ra\bar{b}\bar{c}+r\bar{a}\bar{b}c = \bar{r}+r(a\bar{b}\bar{c}+\bar{a}\bar{b}c)$ <br> $0(extra) = ra\bar{b}\bar{c}+r\bar{a}bc+r\bar{a}ba = r(a\bar{b}\bar{c}+\bar{a}bc+\bar{a}\bar{b}c)$ |

FIG. 8A

| $Z_1Z_2$ / $Z_3Z_4$ | | 2I <br> 00 | I <br> 01 | 0 <br> 11 | <br> 10 |
|---|---|---|---|---|---|
| 2I | 00 | a | a | | |
| I | 01 | a | | | |
| 0 | 11 | a | | | |
| | 10 | | | | |

KARNAUGH MAP FOR a

FIG. 8B

| | $Z_1Z_2$ / $Z_3Z_4$ | 2I 00 | I 01 | 0 11 | 10 |
|---|---|---|---|---|---|
| 2I | 00 | b | | b | |
| I | 01 | b | | | |
| 0 | 11 | | b | | |
| | 10 | | | | |

KARNAUGH MAP FOR b

FIG. 8C

| | $Z_1Z_2$ / $Z_3Z_4$ | 2I 00 | I 01 | 0 11 | 10 |
|---|---|---|---|---|---|
| 2I | 00 | c | | | |
| I | 01 | | | c | |
| 0 | 11 | c | c | | |
| | 10 | | | | |

KARNAUGH MAP FOR c

FIG. 8D

| | $Z_1Z_2$ / $Z_3Z_4$ | 2I<br>00 | I<br>01 | 0<br>11 | <br>10 |
|---|---|---|---|---|---|
| 2I | 00 | r | r | r | x |
| I | 01 | r |  | r | x |
| 0 | 11 | r | r | r | x |
|  | 10 | x | x | x | x |

KARNAUGH MAP FOR r

FIG. 9

| r | $\overline{Z_1Z_2Z_3} + Z_2\overline{Z_3Z_4} + \overline{Z_1}Z_3Z_4 + \overline{Z_1}Z_2Z_4 = \overline{Z_1}(\overline{Z_2Z_3} + Z_3Z_4) + Z_2(\overline{Z_3Z_4} + \overline{Z_1}Z_4)$ |
|---|---|
| a | $\overline{Z_1Z_3Z_4} + \overline{Z_1Z_2}Z_4 = \overline{Z_1}(\overline{Z_3Z_4} + \overline{Z_2}Z_4)$ |
| b | $\overline{Z_1Z_2Z_3} + \overline{Z_1}Z_2\overline{Z_3}Z_4 + \overline{Z_1}Z_2Z_3Z_4 = \overline{Z_1}(\overline{Z_2Z_3} + Z_2\overline{Z_3}Z_4) + Z_1Z_2\overline{Z_3}Z_4$ |
| c | $\overline{Z_1Z_2Z_3Z_4} + Z_1Z_2\overline{Z_3}Z_4 + \overline{Z_1}Z_3Z_4 = \overline{Z_3}(\overline{Z_1Z_2}Z_4 + Z_1Z_2Z_4) + \overline{Z_1}Z_3Z_4$ |

DATA TRANSMISSION APPARATUS AND METHOD FOR TRANSMITTING DATA IN DELAY-INSENSITIVE DATA TRANSMISSION METHOD SUPPORTING HANDSHAKE PROTOCOL

CROSS-REFERENCE TO RELATED APPLICATION

This application claims priority to and the benefit of Korean Patent Application No. 10-2014-0127830, filed on Sep. 24, 2014, the disclosure of which is incorporated herein by reference in its entirety.

BACKGROUND

1. Field of the Invention

The present invention relates to a data transmission apparatus and method for transmitting data in a delay-insensitive (DI) data transmission method supporting a handshake protocol, and more particularly, to a data transmission apparatus and method capable of reducing power consumption and complexity caused by a large number of wires in a large-scale system on chip (SoC) design, such as a globally asynchronous locally synchronous (GALS) system.

2. Discussion of Related Art

Currently, due to the development of semiconductor process technology and integrated circuit design technology, integrated circuit systems are designed in an SoC scheme implemented in units of chips.

Recently, with the further development of semiconductor process technology and integrated circuit design technology, the number of devices which can be integrated in one chip is gradually increasing, and as a result, the wiring structure of transmission lines designed in one chip is becoming more complicated.

Therefore, when integrated circuit systems are implemented in the SoC scheme, the number of wires, the lengths of the wires, signal delays caused by interference between the respective wires, etc. are very important design variables to be taken into consideration for normal operations of the overall chip.

Meanwhile, when a synchronous design using a global clock is applied to integrated circuit systems implemented in the SoC scheme, clock skew and jitter are caused by an increase in clock speed, a transmission delay of data is caused by an increase in the number and the lengths of transmission lines, and so on. These problems can be solved by applying an asynchronous design to integrated circuit systems implemented in the SoC scheme.

In the asynchronous design, no global clock is used, and data transmission is performed by a DI data transmission method supporting a handshake protocol which is irrelevant to a delay time.

By applying such an asynchronous design to the synchronous design, it is possible to solve the problems caused by the synchronous design. However, to implement such an asynchronous design, the design of an overall circuit becomes complicated, and a function of computer aided design (CAD) tools for an asynchronous design is insufficient.

Thus, to solve the problems of both the synchronous design and the asynchronous design at the same time, a GALS system has been proposed.

The GALS system basically does not use a global clock, and includes a plurality of locally synchronous (LS) modules which operate using clocks independent of each other. Data transmission between the respective LS modules is performed according to an asynchronous handshake protocol.

Since such a GALS system does not use a global clock, the problems of clock skew, jitter, etc. are solved. Also, data transmission between LS modules which operate at different timings is performed by the DI data transmission method, and thus it is possible to secure stable data transmission.

In the DI data transmission method, data is expressed using encoding schemes, such as dual-rail encoding and 1-of-4 encoding, and a 4-phase handshaking protocol is used like in an existing synchronous design.

According to the 4-phase handshaking protocol, data is basically expressed as a binary value of a return to zero (RZ) type. In other words, in the 4-phase handshaking protocol, there is a space state for distinguishing continuous data. Since the space state has the same latency as data, a 2-phase handshaking protocol method having no space state is more effective than the 4-phase handshaking protocol method in the GALS system in which data transmission frequently occurs.

According to the 2-phase handshaking protocol based on a dual-rail, which is known as a level-encoded 2-phase dual-rail (LEDR), one wire is encoded with data and the other wire is encoded with a phase change. This is different from an existing dual-rail-based 2-phase protocol in which data transmission of "0" and "1" is encoded with state changes of the respective two wires. In other words, data of "0" and "1" are encoded not with a state change but with a level in one wire, and distinctions between data are made with a change of the other wire.

As a result, an XOR value of the two wires changes every time data is transmitted, and this is detected to determine validity of data. Since the LEDR is not necessary to decode data, the LEDR has higher performance and less design complexity than the existing dual-rail-based 2-phase protocol. However, since 2N+1 wires are required for N-bit data transmission, performance, power consumption, and design complexity of the LEDR are degraded due to the increased number of wires.

A variety of technologies for reducing the number of wires is currently under development, and representatively, the following previous literature has been disclosed.

(1) "New signal transmitting and receiving device for wiring system" (Korean Patent Application No. 10-1997-0018460)

The above previous literature proposes a method of simultaneously transmitting several different kinds of signals through one wire among a plurality of function blocks in an integrated circuit to reduce an area occupied by wires.

According to the previous literature, theoretically, while N-bit data is transmitted, $2^N$ voltage values having a triangular pulse shape are encoded and transmitted through one wire, and a receiver circuit receives the encoded data and restores the encoded data to the N-bit data. Therefore, the number of wires necessary for wiring is reduced, such that the area of an integrated circuit can be reduced.

However, as the number of voltage values which are encodable in a wire increases, the number of kinds of logic to be decoded increases. As a result, the complexity of a receiver circuit remarkably increases, and thus the number of wires that can be reduced is limited.

Also, in a trend toward lowering a supply voltage in an integrated circuit, the current-mode multi-valued logic circuit technology for expressing a plurality of states using a voltage which is used in the previous literature may degrade a noise margin characteristic of a voltage in a receiver circuit.

Further, the previous literature does not support a handshake protocol necessary for DI data transmission, and thus cannot be applied to a GALS system.

(2) "Delay-insensitive data transfer circuit using current-mode multi-valued logic (Korean Patent Application No. "10-2004-0011299)" and "Low static powered delay-insensitive data transfer apparatus (Korean Patent Application No. 10-2006-0119056)"

Unlike the aforementioned previous literature (Korean Patent Application No. 10-1997-018460), the previous literature (Korean Patent Application No. 10-2004-0011299) proposes a protocol which supports a handshake protocol and employs a ternary encoding method to reduce the number of wires.

According to the previous literature (Korean Patent Application No. 10-2004-0011299), it is possible to express three kinds of logic in one wire using a current-mode multi-valued logic circuit without affecting the noise margin of a supply voltage, and thus a circuit for N-bit data transmission can be designed with N+1 wires.

Also, according to the previous literature (Korean Patent Application No. 10-2006-0119056), power consumption in a standby state is drastically reduced by complementing a high static current consumption characteristic of an existing current-mode DI transmission method.

However, according to the two data transmission methods using a current-mode circuit (Korean Patent Application Nos. 10-2004-0011299 and 10-2006-0119056), N inputs are encoded with N+1 wires, and thus the two data transmission methods are not satisfactory in terms of a reduction in the number of wires.

(3) "Data transmission device, data receiving device, data transmitting system, and method for transmitting data (Korean Patent Application No. "10-2008-0119279)"

The previous literature proposes a 2-phase signaling technique of a current-mode DI transmission method. According to the previous literature, in order for an encoder to compare currently input data with the next data, synchronization between an input request signal and a data signal is assumed, and a delay element is inserted into the data signal to extract delayed current data from the next request signal.

However, when an encoder is designed on only synchronization assumption that a data signal should be stabilized prior to a request signal in an asynchronous signal environment, a designer is required to know the largest time difference between an input request signal and a data signal and the shortest period of request signals.

This may make it very difficult to determine a delay time of a delay element, and in some cases (the largest time difference between an input request signal and a data signal > the shortest period of request signals), it may not be possible to find a satisfactory delay time of a delay element. This means that it is not possible to ensure the functionality of an encoder.

According to the previous literature (Korean Patent Application No. 10-2008-0119279), a decoder uses a D flip-flop to restore a data signal, and additional logic for providing a data capturing time point of the device, that is, a clock signal of the device, is necessary.

Also, the previous literature (Korean Patent Application No. 10-2008-0119279) does not proposes a method of reducing the latency of data transmission through a long wire, such as buffer insertion, used in binary data transmission based on a voltage mode. In other words, implementation is complicated.

Further, according to the previous literature (Korean Patent Application No. 10-2008-0119279), N inputs are encoded with N+1 wires, like in the above-described previous literature, and thus the previous literature (Korean Patent Application No. 10-2008-0119279) is not satisfactory in terms of a reduction in the number of wires.

SUMMARY OF THE INVENTION

The present invention is directed to providing a data transmission apparatus and a method for reducing the number of wires for data transmission in a system on chip (SoC) design, such as a Globally Asynchronous Locally Synchronous (GALS) system.

According to an aspect of the present invention, there is provided a data transmission apparatus for transmitting data in a Delay-Insensitive (DI) data transmission method supporting a handshake protocol, the data transmission apparatus including: a sender configured to output a binary-valued logic signal based on binary-valued logic; and an encoder configured to encode the binary-valued logic signal input through input wires into a multi-valued logic signal based on multi-valued logic, and transmit the encoded multi-valued logic signal to a decoder through output wires. Here, the encoder includes a mapping table storing input variables including a number of input wires and a number of output wires smaller than the number of input wires and the multi-valued logic signal corresponding to the input variables, and encodes the binary-valued logic signal into the multi-valued logic signal with reference to the mapping table.

According to another aspect of the present invention, there is provided a data transmission method of transmitting data in a DI data transmission method supporting a handshake protocol, the data transmission method including: constructing a mapping table storing input variables including a number of input wires and a number of output wires smaller than the number of input wires and multi-valued logic signals corresponding to the input variables; encoding a binary-valued logic signal input through the input wires into a multi-valued logic signal based on multi-valued logic with reference to the mapping table; and transmitting the encoded multi-valued logic signal to a decoder through the output wires.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3 shows a mapping table storing a multi-valued logic combination according to the number of wires connected to the output terminals of the MUX shown in FIG. 2;

FIG. 6 is a mapping table used in the data transmission environment shown in FIG. 5;

FIG. 7 is a table showing a Boolean function of two output variables in a Sum-Of-Product (SOP) form;

FIGS. 8A to 8D show tables of Karnaugh maps of a line decoding circuit according to an exemplary embodiment of the present invention;

FIG. 9 is a table showing Boolean functions derived from the Karnaugh maps shown in FIG. 8.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
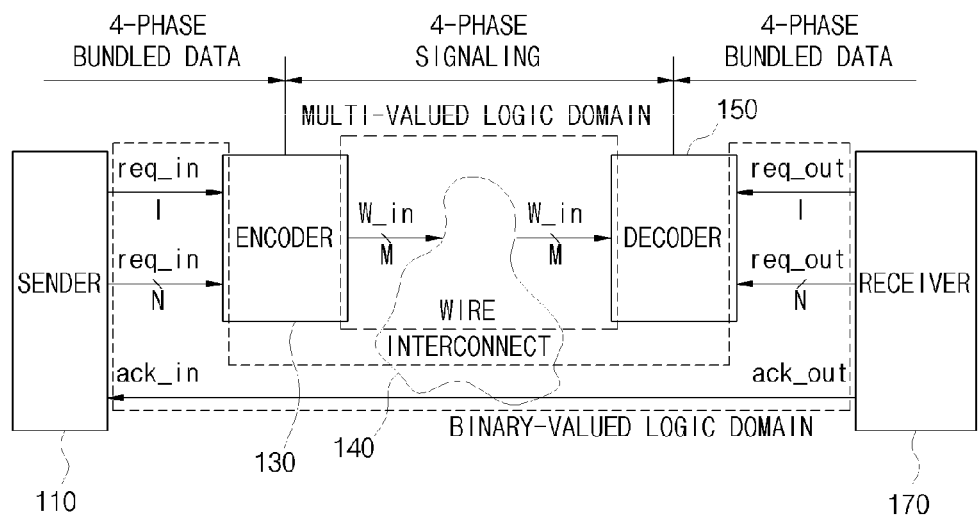
FIG. 1 is an overall system block diagram showing an N-bit data transmission environment according to an exemplary embodiment of the present invention.

FIG. 1 is a block diagram showing a data transmission environment according to an exemplary embodiment of the present invention.

Referring to FIG. 1, a data transmission apparatus 100 according to an exemplary embodiment of the present invention includes a sender 110 and a receiver 170 which exchange data with the outside thereof using handshake signals based on 4-phase signaling.

Also, the data transmission apparatus 100 according to an exemplary embodiment of the present invention includes an encoder 130 and a decoder 150 for interfacing between the sender 110 and the receiver 170.

The encoder 130 and the decoder 150 are connected through wire interconnects 140 according to multi-valued logic to reduce a number M of wires, and as shown in FIG. 1, a Multi-valued Domain (MD) is defined between the encoder 130 and the decoder 150.

Specifically, the sender 110 is connected to the encoder 130 through N wires, and transmits a request signal req_in based on binary-valued logic and an N-bit data signal data_in to the encoder 130. Here, the request signal req_in is a signal for extracting a binary value "1" or "0" representing the data signal data_in, and samples the data signal data_in.

The encoder 130 encodes the request signal req_in received through one wire and the N-bit data signal data_in received through the N wires into a multi-valued logic signal W_in according to multi-valued logic. Here, the multi-valued logic signal W_in may be expressed as at least three different voltage levels (e.g., 0, V, and 2V) or at least three different current levels (e.g., 0, I, and 2I).

The present invention is not particularly limited, but in this exemplary embodiment, it is assumed that a multi-valued logic signal is expressed as a plurality of voltage levels, which is referred to as Current-Mode Multi-Valued Logic (CMMVL).

The multi-valued logic signal W_in encoded into at least three different current levels is transferred as a multi-valued logic signal W_out to the decoder 150 through M, which is smaller than N+1, wires 140.

The decoder 150 decodes the multi-valued logic signal W_out which has been encoded into the different voltage levels and received into a request signal req_out expressed as a binary logic value and an N-bit data signal data_out, transfers the decoded request signal req_out to the receiver 170 through one wire, and transfers the decoded N-bit data signal data_out to the receiver 170 through N wires.

When the reception of the request signal req_out decoded into the binary logic value and the N-bit data signal data_out is completed, the receiver 170 generates an acknowledgement signal ack_out of the binary logic value which acknowledges completion of the reception, and transmits the generated acknowledgement signal ack_out as an acknowledgement signal ack_in to the sender 110 through wires 140. In this way, one cycle for one data transmission is finished.

Meanwhile, in a data transmission environment according to an exemplary embodiment of the present invention, data transmission between a sender and an encoder, data transmission between a decoder and a receiver, and data transmission between the sender and the receiver are performed based on the binary-valued logic, unlike data transmission based on multi-valued logic performed between the encoder and the decoder. Therefore, in a data transmission environment according to an exemplary embodiment of the present invention, a Binary-valued logic Domain (BD) distinguished from the aforementioned MD is generated as shown in FIG. 1.

An encoding method for reducing the number M of wires connecting the encoder 130 and the decoder 150 according to an exemplary embodiment of the present invention will be described in detail below with reference to FIG. 2.

Figure 2:
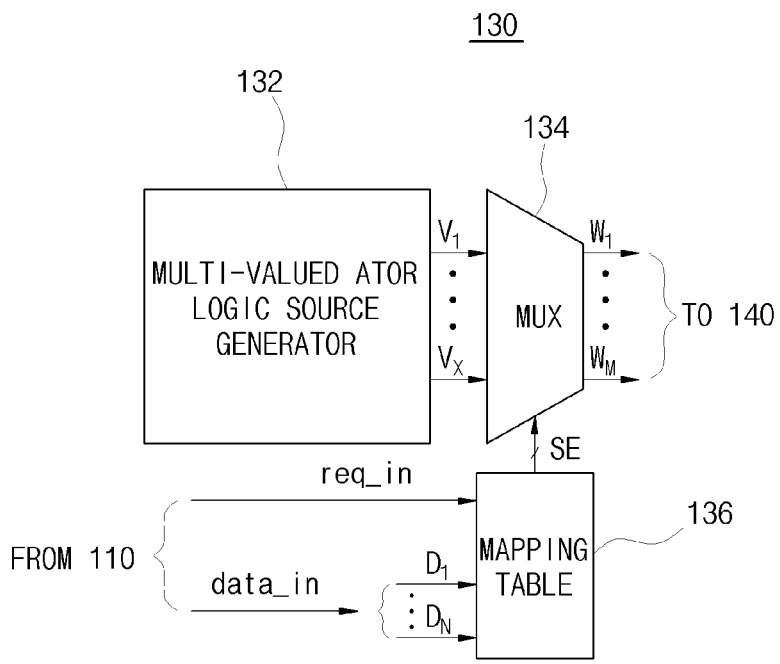
FIG. 2 is a block diagram schematically showing an internal configuration of an encoder shown in FIG. 1.

FIG. 2 is a block diagram schematically showing a configuration of an encoder shown in FIG. 1.

Referring to FIG. 2, the encoder 130 of the data transmission apparatus 100 according to an exemplary embodiment of the present invention includes a multi-valued logic source generator 132, a multiplexer (MUX) 134, and a mapping table 136 to encode data based on multi-valued logic.

The multi-valued logic source generator 132 generates X multi-valued logic sources $V_1$ to $V_X$ having different current levels.

The MUX 134 receives the generated X multi-valued logic sources $V_1$ to $V_X$, selects M multi-valued logic sources from among the X multi-valued logic sources $V_1$ to $V_X$ according to a control signal SE from the mapping table 136, and allocates the selected M multi-valued logic sources to M respective wires.

Which multi-valued logic sources are allocated to the M respective wires may be determined according to the control signal SE transferred from the mapping table 136.

The mapping table 136 stores the number M of wires $W_1$ to $W_M$ connected to output terminals of the MUX 134, and multi-valued logic combinations mapped to combinations of the request signal req_in based on binary values and the N-bit data signal data_in.

FIG. 3 shows a mapping table storing a multi-valued logic combination for an available input combination (req_in and data_in) according to the number M of wires $W_1$ to $W_M$ connected to the output terminals of the MUX 134.

The mapping table 136 receives the number M of wires currently connected to the output terminals of the MUX 134, the request signal req_in and the N-bit data signal data_in currently transferred from the sender 110 as variables, extracts a multi-valued logic combination mapped to the variables, and outputs the control signal SE including the extracted multi-valued logic combination.

In response to the multi-valued logic combination included in the control signal SE, the MUX 134 determines which multi-valued logic sources are allocated to the M respective wires.

As a result, since the above-described mapping table 136 is constructed in advance, when the number N+1 of wires connected to input terminals of the encoder 130 (or the MUX 134) and the number M of the wires $W_1$ to $W_M$ connected to output terminals are determined, it is possible to determine a multi-valued logic combination mapped to the determined respective numbers N+1 and M of wires with reference to the mapping table 136.

Therefore, in the mapping table 136, the number N+1 of wires connected to the input terminals of the encoder 130 (or the MUX 134) and the number M of the wires $W_1$ to $W_M$ connected to the output terminals become variables.

For the present invention's purpose of reducing the number of wires, the determination of variables requires that the number N+1 of wires connected to input terminals of an encoder (or a MUX) be smaller than the number M of wires connected to output terminals. In the following description of an encoding method, a method of determining the respective numbers of wires will be described.

An encoding method using the encoder shown in FIG. 2 will be described in detail below.

An input signal based on 4-phase signaling input to the mapping table 136 includes the request signal req_in (hereinafter referred to as "req") and the N-bit data signal data_in (hereinafter referred to as "$D_1$ to $D_N$").

The X multi-valued logic sources $V_1$ to $V_X$ are generated by the multi-valued logic source generator 132, and the N-bit data signal $D_1$ to $D_N$ is encoded into M multi-valued logic sources selected by the mapping table 136 from among the X multi-valued logic sources $V_1$ to $V_X$.

Therefore, one selected from among the X multi-valued logic sources $V_i$ to $V_X$ is allocated to each of the output wires $W_1$ to $W_M$.

Which multi-valued logic sources are allocated to the respective output wires $W_1$ to $W_M$ is determined by the input signals req and $D_1$ to $D_N$ input to the mapping table 136.

When the request signal req is 1, the number of pieces of data expressible by the input signals req and $D_1$ to $D_N$ in the binary-valued logic is the sum of $2^N$ expressed as the N-bit data signals $D_1$ to $D_N$ and 1 representing a case in which the request signal req is 0, that is, $2^N+1$. Here, the request signal req of 1 denotes the transmission start of valid data, and the request signal req of 0 denotes the transmission start of invalid data.

The number of pieces of expressible data among data encoded based on multi-valued logic is $X^M$ because it is possible to separately allocate multi-valued logic signals to the M respective wires connected to output terminals of the encoder 130.

Basically, the number of pieces of expressible data among data to be encoded is required to be equal to or smaller than the number of pieces of expressible data among encoded data. Therefore, the expressible number of pieces of data covered by the output terminals of the encoder 130 is required to satisfy a condition $2^N+1 \leq X^M$.

Also, to reduce the number of wires necessary for transmission, the number M of wires connected to the output terminals of the encoder 130 (referred to as the number of output wires below) is required to be smaller than the number N+1 of wires connected to the input terminals of the encoder 130.

In general, the number of input wires of the encoder 130 is fixed, and thus it is necessary to determine the minimum number of output wires of the encoder 130 and the number of multi-valued logic sources.

First, when the number N+1 of input wires and the number X of multi-valued logic sources are fixed, the minimum number M of output wires may be calculated by Equation 1 below.

$$[M] = \log_x 2^N + 1, \ (X^M \geq 2^{N+1}) \qquad \text{[Equation 1]}$$

In Equation 1, $\lceil M \rceil$ denotes the smallest one of integers larger than M. For example, when N is 4 and X is 3, $\log_3 2^4 + 1$ is about 2.5789 according to Equation 1. Therefore, M is 3 which is the smallest one of integers larger than 2.5789.

On the other hand, when the number M of output wires is fixed, the minimum number X of necessary multi-valued logic sources may be calculated by Equation 2 below.

$$[X] = \sqrt[M]{2^N + 1} \qquad \text{[Equation 2]}$$

FIG. 3 shows an example of the mapping table 136 storing values encoded based on multi-valued logic with respect to input combinations according to the number M of output wires connected to the output terminals of the encoder 130 when the number of input wires connected to the input terminals of the encoder 130 is N.

The mapping table 136 of FIG. 3 includes N+1 input variables ($D_1$ to $D_N$, req) and M output variables ($W_1$ to $W_M$).

The input variables use the binary logic in which 0 and 1 are used, and the request signal req is an activation signal which only indicates the validity of data. Therefore, the number of all possible combinations of input variables is $2^N+1$.

Also, the output variables may use kinds of multi-valued logic of $V_1$ to $V_M \sqrt[M]{2^N+1}$ according to Equation 2 above.

Figure 4:
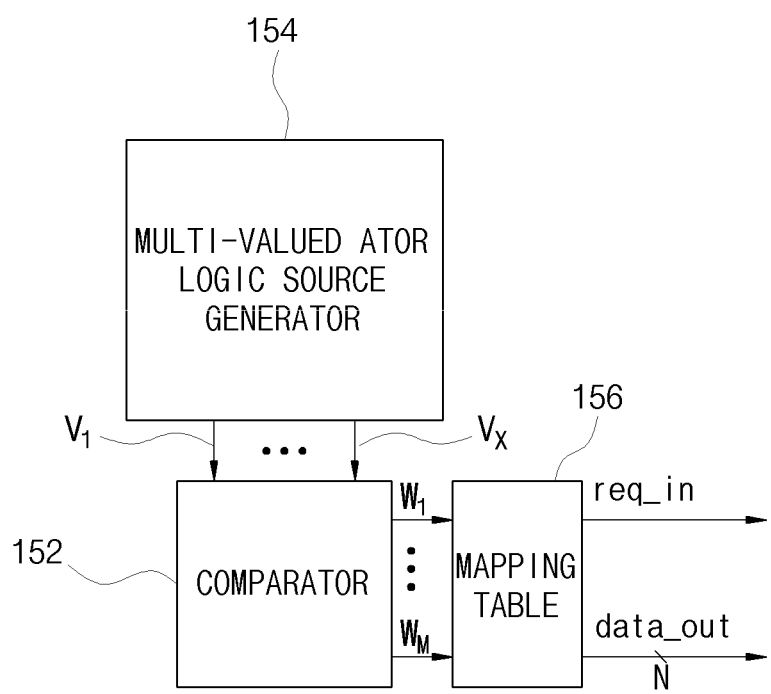
FIG. 4 is a block diagram schematically showing a configuration of a decoder shown in FIG. 1.

FIG. 4 is a block diagram schematically showing a configuration of a decoder shown in FIG. 1.

Referring to FIG. 4, the decoder 150 of the data transmission apparatus 100 according to an exemplary embodiment of the present invention includes a comparator 152, a multi-valued logic generator 154, and a mapping table 156.

The comparator 152 receives the multi-valued logic signal W_out through a wire (140 of FIG. 1), and compares the received multi-valued logic signal W_out with a reference multi-valued logic signal provided by the multi-valued logic generator 154 to analyze the request signal req_in and the data signal data_in based on multi-valued logic.

The mapping table 156 is constructed the same as the mapping table 136 provided in the encoder 130, and decodes the input signals req_in and data_in based on multi-valued logic into input signals req_out and data_out based on the binary-valued logic and mapped to the input signals req_in and data_in based on the multi-valued logic and analyzed by the comparator 152.

Figure 5:
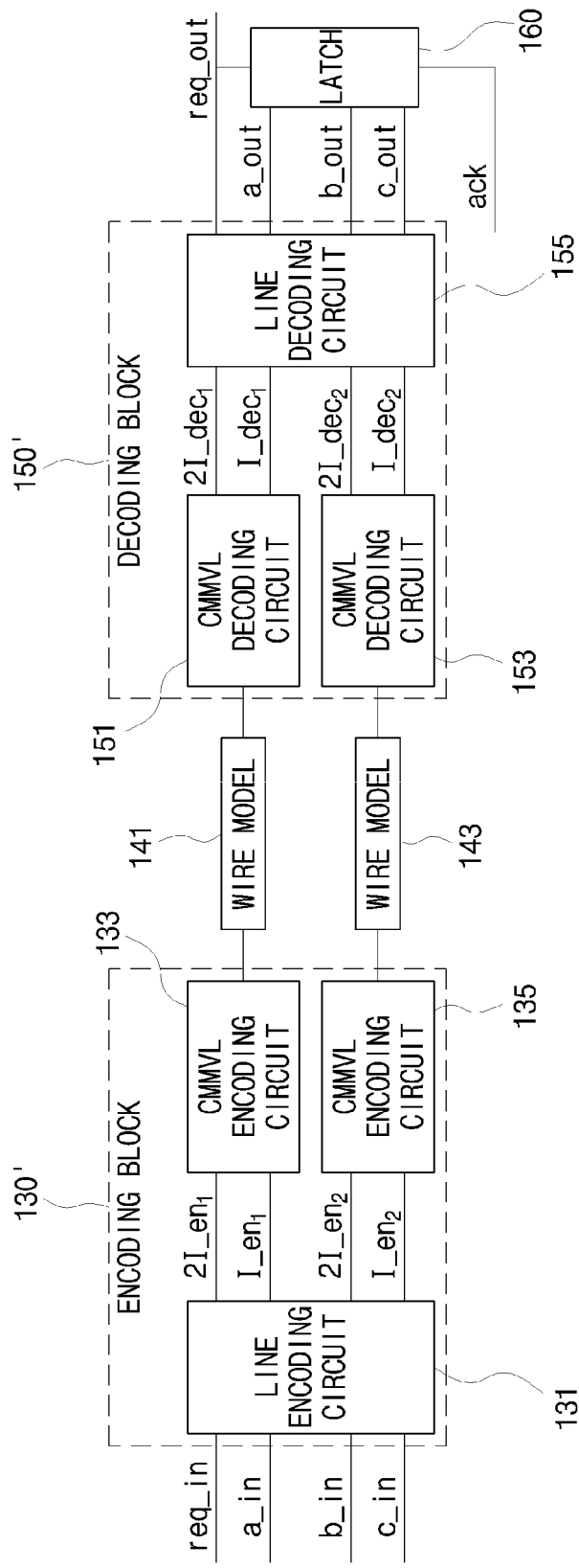
FIG. 5 is a block diagram showing configurations of an encoder and a decoder used in a data transmission environment based on a Current-Mode-based Multi-Valued Logic (CMMVL) according to another exemplary embodiment of the present invention.

FIG. 5 is a block diagram showing configurations of an encoder and a decoder used in a data transmission environment based on Current-Mode-based Multi-Valued Logic (CMMVL) according to another exemplary embodiment of the present invention.

Referring to FIG. 5, an encoding block 130' and a decoding block 150' according to the other exemplary embodiment of the present invention may operate as an N-to-M line encoder and an M-to-N line decoder including a combinational logic circuit, respectively.

The encoding block 130' and the decoding block 150' according to the other exemplary embodiment differ from an existing line encoder and line decoder in that data is encoded and decoded based on multi-valued logic rather than the binary-valued logic.

To this end, each of the encoding block 130' and the decoding block 150' according to the other exemplary embodiment of the present invention includes a multi-valued logic circuit, whereby the number of wires 140 between the encoding block 130' and the decoding block 150' may be reduced.

For convenience of understanding, a data transmission environment in this exemplary embodiment is implemented with three inputs and two outputs and uses the 3-valued logic which is the simplest multi-valued logic.

In this exemplary embodiment, input data has the minimum data size, that is, three bits, for determining a reduction in the number of wires. Therefore, the number M of wires necessary for encoding is two according to a condition $3^M \geq 2^3 + 1$.

Multi-valued logic circuits included in the encoding block 130' and the decoding block 150' according to this exemplary embodiment are classified into a voltage mode and a current mode according to expression methods, and CMMVL circuits will be described as an example in this exemplary embodiment.

The CMMVL circuits applied to this exemplary embodiment use the 3-valued logic expressed as three amounts of current (2I, I, and 0).

A request signal req_in based on the binary-valued logic and 3-bit data a_in, b_in, and c_in are encoded into the amounts of current through the encoding block 130', and the decoding block 150' decodes the request signal and the 3-bit data encoded into the amounts of current into the original request signal req_out based on the binary-valued logic and the original 3-bit data a_out, b_out, and c_out. The restored request signal req_out based on the binary-valued logic and the restored 3-bit data a_out, b_out, and c_out are stored in a latch 160 connected to output terminals of the decoding block 150'.

Specifically, as shown in FIG. 5, the encoding block 130' according to the other exemplary embodiment of the present invention includes a line encoding circuit 131 and first and second CMMVL encoding circuits 133 and 135.

The line encoding circuit 131 transfers first and second control signals $2I\_en_1$ and $I\_en_1/2I\_en_2$ and $I\_en_2$ for selecting three current levels (2I, I, and 0) according to input combinations of the request signal req_in and the 3-bit data a_in, b_in, and c_in to the first and second CMMVL encoding circuits 133 and 135.

Each of the first and second CMMVL encoding circuits 133 and 135 selects one of the three current levels (2I, I, and 0) according to the received control signals $2I\_en_1$ and $I\_en_1/2I\_en_2$ and $I\_en_2$ and outputs the selected current level to a first or second wire 141 or 143.

When the selected current level is neither 2I nor I, the CMMVL encoding circuits 133 and 135 designed in this exemplary embodiment automatically output 0. Therefore, the first and second CMMVL encoding circuits 133 and 135 output only two state signals of 2I and I in practice.

Since the number M of wires necessary for encoding is two, the wires 141 and 143 are used for the two CMMVL encoding circuits 133 and 135, respectively. The total of four control signals $2I\_en_1$, $I\_en_1$, $2I\_en_2$, and $I\_en_2$ are used in pairs.

The encoded data is transferred to the decoding block 150' through the wires 141 and 143.

The decoding block 150' includes first and second CMMVL decoding circuits 151 and 153 and a line decoding circuit 155.

The first and second CMMVL decoding circuits 151 and 153 decode the received amounts of current to generate decoded control signals $2I\_dec_1$ and $I\_dec_1/2I\_dec_2$ and $I\_dec_2$.

The line decoding circuit 155 receives the control signals $2I\_dec_1$ and $I\_dec_1/2I\_dec_2$ and $I\_dec_2$, decodes the control signals $2I\_dec_1$ and $I\_dec_1/2I\_dec_2$ and $I\_dec_2$ into the original request signal req_out and the original data signals a_out, b_out, and c_out, and stores the decoded request signal req_out and the decoded data signals a_out, b_out, and c_out in the latch 160.

The line encoding circuit 153 and the line decoding circuit 155 according to the other exemplary embodiment of the present invention are combinational logic circuits and express N input bits as M output bits. To design such combinational logic circuits, it is necessary to construct a truth table for a desired circuit operation in advance.

FIG. 3 exemplifies a mapping table according to all multi-valued logic combinations, and mapping tables according to various multi-valued logic combinations may be constructed based on the mapping table.

FIG. 6 is a mapping table used in the data transmission environment shown in FIG. 5.

Referring to FIG. 6, in the mapping table, input variables obtained by combining 1-bit request signal r and 3-bit data a, b, and c are allocated to two output variables $W_1$ and $W_2$.

When the request signal r is 1, the number of cases of an input variable expressed by the 3-bit data a, b, and c is eight ($=2^3$), and when the request signal r is 0, the number of cases of the input variable expressed by the 3-bit data a, b, and c is one. Therefore, the input variable has a total of nine data symbols.

Since output variables use the 3-valued logic of 0, I, and 2I, two ($3^M = 9$) output variables are necessary to express nine data symbols.

Through a given truth table, a Boolean function in a Sum-Of-Product (SOP) or product-of-sum (POS) form may be derived from each output variable. In general, due to a short propagation delay time and a small number of transistors, the SOP form is better for circuit implementation. FIG. 7 is a table showing the Boolean functions of the two output variables $W_1$ and $W_2$ in the SOP form. As described above, when a selected current level is neither 2I nor I, a CMMVL encoding circuit outputs 0, and thus it is not necessary to derive a Boolean function for 0.

A simplified Boolean function is implemented as an actual circuit by a basic logic gate. Accordingly, a condition for 2I, I and 0 to be output from each of the wires $W_1$ and $W_2$ may be extracted from an input signal.

The control signals $2I\_dec_1$ and $I\_dec_1/2I\_dec_2$ and $I\_dec_2$ obtained by the CMMVL decoding circuits 151 and 153 decoding the amounts of current are input to the line decoding circuit 155, and make it possible to derive a Boolean function for an SOP through a Karnaugh map more easily.

FIGS. 8A to 8D shows tables of Karnaugh maps of a line decoding circuit according to an exemplary embodiment of the present invention, and FIG. 9 is a table showing Boolean functions derived from the Karnaugh maps shown in FIG. 8.

As shown in FIGS. 8A to 8D, in the process of constructing a Karnaugh map, $2I\_dec_1$, $I\_dec_1$, $2I\_dec_2$, and $I\_dec_2$ are changed to Z1, Z2, Z3, and Z4 for intuitiveness, respectively. FIG. 9 shows the Boolean functions according to the changed Z1, Z2, Z3, and Z4.

Since the respective CMMVL decoding circuits 151 and 153 output 11 when 2I is input, 00 and I are input, and 01 and 0 are input for pairs of (Z1, Z2) and (Z3, Z4), a truth table may be constructed based on Karnaugh maps according to input current levels.

Figure 10:
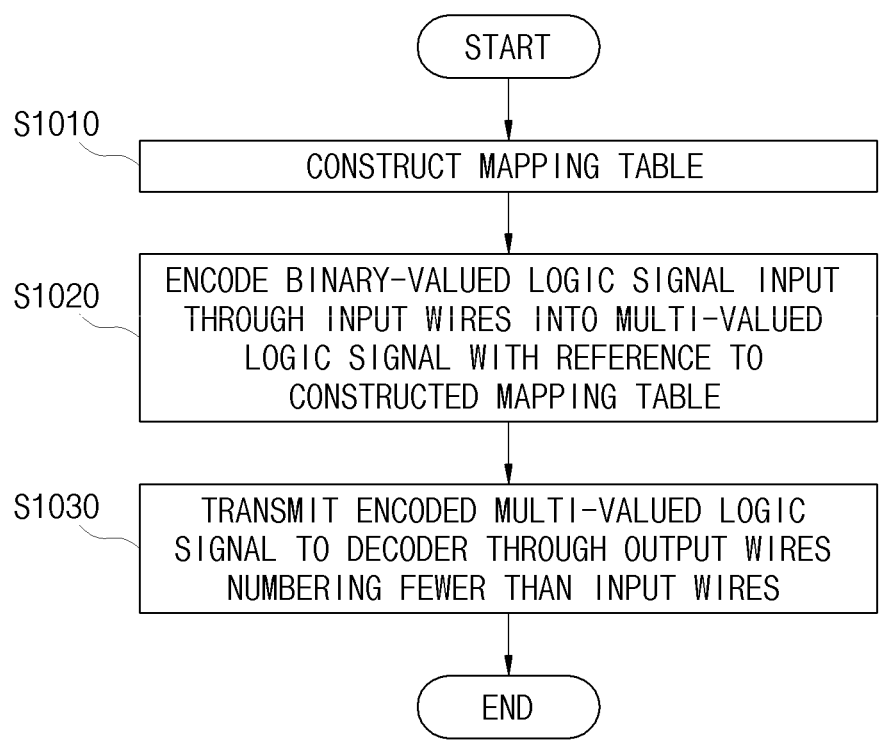
FIG. 10 is a flowchart illustrating a data transmission method according to an exemplary embodiment of the present invention.

FIG. 10 is a flowchart illustrating a data transmission method according to an exemplary embodiment of the present invention.

Referring to FIG. 10, first, an operation of constructing a mapping table used to encode the binary-valued logic signal input through input wires into a multi-valued logic signal based on multi-valued logic is performed (S1010).

Specifically, in this operation S1010, an operation of determining any one of the number of output wires and the number of multi-valued logic sources for generating the multi-valued logic signal is first performed. The number of output wires may be determined by Equation 1 mentioned above, and the number of multi-valued logic sources may be determined by Equation 2 mentioned above. Subsequently, an operation of constructing the number of input wires, the number of output wires, and the number of multi-valued logic sources as variables and mapping the constructed input variables to a plurality of multi-valued logic signals (or multi-valued logic combinations) corresponding to the constructed input variables to construct a table as shown in FIG. 3 is performed.

Subsequently, an operation of encoding the binary-valued logic signal input through the input wires into a multi-valued logic signal based on multi-valued logic with reference to the constructed mapping table is performed (S1020), and an operation of transmitting the encoded multi-valued logic signal to a decoder through the output wires is performed (S1030).

As described above, according to exemplary embodiments of the present invention, it is possible to reduce the power consumption and the complexity caused by a large number of wires in a large-scale System on Chip (SoC) design, such as a Globally Asynchronous Locally Synchronous (GALS) system.

Also, exemplary embodiments of the present invention use multi-valued logic instead of the existing binary logic.

Using the existing binary logic, it is possible to express $2^N$ data symbols with N-bit data, and when multi-valued logic is used, the N-bit data can be expressed in the form of an exponent equivalent thereto in size. In other words, when the number of output wires is M and the number of kinds of multi-valued logic expressible in one wire is X, the number of kinds of multi-valued logic can be expressed as $X^M$. The total number of combinations expressible with N input wires (the number of wires except for a wire for transmitting a request signal) is $2^N$, and the total number of combinations including a case in which the request signal is 0 is $2^N+1$.

As a result, in an encoding method according to exemplary embodiments of the present invention, data is encoded with reference to a mapping table constructed according to a condition $2^N+1 \geq X^M$, and thus it is possible to create a data transmission environment having the number of output wires smaller than the number of input wires.

Further, since the number M of output wires decreases as the number of kinds of multi-valued logic increases, it is possible to transmit data having the same size with the number M of output wires smaller than N.

According to exemplary embodiments of the present invention, it is possible to reduce the number of output wires by encoding a binary-valued logic signal into a multi-valued logic signal with reference to a mapping table which stores input variables including the number of input wires and the number of output wires smaller than the number of input wires and the multi-valued logic signal corresponding to the input variables.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A data transmission apparatus for transmitting data in a Delay-Insensitive (DI) data transmission method supporting a handshake protocol, the data transmission apparatus comprising:
    a sender configured to output a binary-valued logic signal based on binary-valued logic; and
    an encoder configured to encode the binary-valued logic signal input through input wires into a multi-valued logic signal based on multi-valued logic, and transmit the encoded multi-valued logic signal to a decoder through output wires,
    wherein the encoder includes a mapping table storing input variables including a number of input wires and a number of output wires smaller than the number of input wires and the multi-valued logic signal corresponding to the input variables, and encodes the binary-valued logic signal into the multi-valued logic signal with reference to the mapping table, and
    wherein the encoder extracts a logic combination of the binary-valued logic signal expressed according to the number of input wires and the multi-valued logic signal mapped to the number of output wires with reference to the mapping table, and encodes the binary-valued logic signal into the extracted multi-valued logic signal.

2. The data transmission apparatus of claim 1, wherein the encoder encodes the binary-valued logic signal into the multi-valued logic signal with reference to the mapping table storing the input variables further including a number of multi-valued logic sources and the multi-valued logic signal corresponding to the input variables.

3. The data transmission apparatus of claim 2, wherein the encoder extracts the multi-valued logic signal mapped to a logic combination of the binary-valued logic signal expressed according to the number of input wires, the number of output wires, and the number of multi-valued logic sources with reference to the mapping table, and encodes the binary-valued logic signal into the extracted multi-valued logic signal.

4. The data transmission apparatus of claim 3, wherein the encoder includes:
    a multi-valued logic source generator configured to generate a plurality of multi-valued logical sources having a plurality of different current levels or a plurality of different voltage levels; and
    a multiplexer (MUX) configured to receive the logic combination of the binary-valued logic signal expressed according to the number of input wires, the number of output wires, and a multi-valued logic combination mapped to the number of multi-valued logic sources from the mapping table as a control signal, selectively output a multi-valued logic source corresponding to the received control signal among the plurality of multi-valued logic sources as the encoded multi-valued logic signal, and transmit the encoded multi-valued logic signal to the decoder through the output wires.

5. A data transmission method for transmitting data in a Delay-Insensitive (DI) data transmission method supporting a handshake protocol, the data transmission method comprising:
    constructing a mapping table storing input variables including a number of input wires and a number of output wires smaller than the number of input wires and multi-valued logic signals corresponding to the input variables;
    encoding a binary-valued logic signal input through the input wires into a multi-valued logic signal based on multi-valued logic with reference to the mapping table; and
    transmitting the encoded multi-valued logic signal to a decoder through the output wires, and
    wherein the encoding of the binary-valued logic signal includes
    extracting a logic combination of the binary-valued logic signal expressed according to the number of input wires and the multi-valued logic signal mapped to the number of output wires with reference to the mapping table; and
    encoding the binary-valued logic signal into the extracted multi-valued logic signal.

6. The data transmission method of claim 5, wherein the constructing of the mapping table comprises:
    determining any one of the number of output wires and a number of multi-valued logic sources for generating the multi-valued logic signal;
    constructing the number of input wires and the determined one as input variables; and
    constructing the constructed input variables and a plurality of multi-valued logic signals corresponding to the constructed input variables in a table form.

7. The data transmission method of claim 6, wherein the determining of the number of output wires comprises determining the number of output wires by Equation 1 below:

$$\lceil M \rceil = \log_x 2^N + 1, \ (X^M \geq 2^{N+1}) \quad \text{[Equation 1]}$$

where M is the number of output wires, $\lceil M \rceil$ denotes the smallest one of integers larger than M, X is the number of multi-valued logic sources, and $2^N+1$ is the number of input wires.

8. The data transmission method of claim 6, wherein the determining of the number of multi-valued logic sources comprises determining the number of multi-valued logic sources by Equation 2 below:

$$\lceil X \rceil = \sqrt[M]{2^N+1} \quad \text{[Equation 2]}$$

where X is the number of multi-valued logic sources, M is the number of output wires, and $2^N+1$ is the number of input wires.

9. The data transmission method of claim 5, wherein the encoding of the binary-valued logic signal comprises encoding the binary-valued logic signal into the multi-valued logic signal with reference to the mapping table storing the input variables further including a number of multi-valued logic sources and the multi-valued logic signal corresponding to the input variables.

10. The data transmission method of claim 9, wherein the encoding of the binary-valued logic signal comprises:
    extracting the multi-valued logic signal mapped to a logic combination of the binary-valued logic signal expressed according to the number of input wires, the number of output wires, and the number of multi-valued logic sources with reference to the mapping table; and
    encoding the binary-valued logic signal into the extracted multi-valued logic signal.

* * * * *